US012463357B1

(12) United States Patent
Klein et al.

(10) Patent No.: US 12,463,357 B1
(45) **Date of Patent: *Nov. 4, 2025**

(54) SOLDERLESS WIRE CONNECTOR

(71) Applicant: Titan3 Technology LLC, Tempe, AZ (US)

(72) Inventors: John E. Klein, Chandler, AZ (US); Jeffrey P. Baldwin, Anthem, AZ (US)

(73) Assignee: Titan3 Technology LLC, Tempe, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/419,181

(22) Filed: Jan. 22, 2024

Related U.S. Application Data

(63) Continuation of application No. 17/838,112, filed on Jun. 10, 2022, now Pat. No. 12,003,068, which is a continuation-in-part of application No. 17/695,775, filed on Mar. 15, 2022, now Pat. No. 11,881,668, which is a continuation of application No. 16/887,610, filed on May 29, 2020, now Pat. No. 11,276,945.

(51) Int. Cl.
*H01R 4/22* (2006.01)

(52) U.S. Cl.
CPC .................................... *H01R 4/22* (2013.01)

(58) Field of Classification Search
CPC ........................................................ H01R 4/22
USPC ........................................................... 174/87
See application file for complete search history.

(56) References Cited

U.S. PATENT DOCUMENTS

| | | | | |
|---|---|---|---|---|
| 3,519,707 | A | 7/1970 | Krup | |
| 5,001,301 | A | 3/1991 | Marr | |
| 6,677,530 | B2 | 1/2004 | Blaha | |
| D523,821 | S | 6/2006 | Michaud | |
| 7,365,270 | B2 | 4/2008 | Michaud | |
| 11,276,945 | B1 | 3/2022 | Klein | |
| 11,881,668 | B1 * | 1/2024 | Klein | H01R 4/22 |
| 12,003,068 | B1 * | 6/2024 | Klein | H01R 4/22 |
| 2009/0283293 | A1 | 11/2009 | Hiner | |

OTHER PUBLICATIONS

Twister® ProFLEX™ Wire Connector, Model 347 Red/Yellow: https://idealind.com/shop/twister-proflex-347-box-of-50.html.

* cited by examiner

*Primary Examiner* — Chau N Nguyen
(74) *Attorney, Agent, or Firm* — Kenneth C. Booth; Booth Udall, PLC

(57) ABSTRACT

A wire connector includes an outer shell with a wire cavity therein, a plurality of raised ribs on the surface of the outer shell, each of the raised ribs having a rib cap overmolded on to a top surface with a gap between the rib cap corresponding to each of the raised ribs and the rib cap corresponding to each adjacent raised rib. Two leverage wings may extend outward from the outer shell on opposing sides. A wire skirt may be overmolded around the open end of the outer shell, the wire skirt and plurality of rib caps formed of a material more flexible than a material used to form the outer shell. A wing rib may be overmolded onto a portion of the first side of each leverage wing. A base of the wire connector may include texture in the form of raised grip bumps of various shapes.

20 Claims, 10 Drawing Sheets

SOLDERLESS WIRE CONNECTOR

CROSS REFERENCE TO RELATED APPLICATIONS

This application is a continuation of U.S. Utility patent application Ser. No. 17/838,112, filed on Jun. 10, 2022 entitled "Solderless Wire Connector" to John E. Klein et al. which is a continuation of U.S. Utility patent application Ser. No. 17/695,775, filed on Mar. 15, 2022, entitled "Solderless Wire Connector" to John E. Klein et al., which is a continuation-in-part of U.S. Utility patent application Ser. No. 16/887,610 entitled "Solderless Wire Connector" to John E. Klein et al. that was filed on May 29, 2020, and issued as U.S. Pat. No. 11,276,945 on Mar. 15, 2022, the disclosures of each which are hereby incorporated herein by reference.

TECHNICAL FIELD

Aspects of the present disclosure relate generally to wire connectors, also called wire nuts or wire caps, that are twisted on to one or more wires to protect the end of the wire or electrically couple two or more wires.

BACKGROUND

Wire connectors are known in the industry for electrically coupling wires. Wire connectors are generally formed of a plastic housing and include a tapered, conductive inner connector, often a spring or inwardly threaded receiver, that grips the bare ends of a wire onto which it is rotatably connected. Often, wire connectors are formed with ridges and grooves, or outwardly extending wings to assist a user in gripping the wire connector while twisting it on to the wire(s).

SUMMARY

According to an aspect of the disclosure a wire connector may comprise an outer shell comprising a closed first end and an open second end, a wire cavity within the outer shell configured to rotatably couple to one or more wires, a plurality of raised ribs on the surface of the outer shell, each of the raised ribs defining a channel between the raised rib and an adjacent raised rib, each of the raised ribs comprising an outer surface at the top of each channel, side walls extending from the top of each channel to a bottom of each channel, and a bottom wall connecting the side walls of each raised rib and each adjacent raised rib, and a plurality of rib caps overmolded on to the top surface of each of the plurality of raised ribs, the plurality of rib caps comprising a gap between the rib cap corresponding to each of the raised ribs and the rib cap corresponding to each adjacent raised rib.

Particular embodiments may comprise one or more of the following features. E each of the raised ribs and each of the channels may extend from adjacent the closed first end to a respective terminal end of each raised rib and channel closer the open second end than to the closed first end, the wire connector further comprising an annular base between the terminal ends of the channels and the open second end, the annular base being frustoconical in shape and having a height. The annular base may comprise a smooth surface except for a raised texture on the smooth surface. The raised texture may comprise a plurality of elliptical grip bumps extended outward from the smooth surface of the annular base and spaced about the annular base. The raised texture may comprise a plurality of rectangular grip bumps extended outward from the smooth surface of the annular base and spaced about the annular base. The raised texture may comprise a plurality of elongated rib grip bumps extending outward from the smooth surface of the annular base and spaced about the annular base. Two or more leverage wings extending outward from the outer shell on opposing sides of the outer shell between the first end and the second end. Each of the two leverage wings may comprise a first side and a second side, and a wing rib overmolded on a portion of the first side of each of the leverage wings. A wire skirt overmolded on to the second end of the outer shell, surrounding the open second end, and extending away from the open second end, the wire skirt and plurality of rib caps formed of a material more flexible than a material used to form the outer shell.

According to an aspect of the disclosure, a wire connector may comprise an outer shell comprising a closed first end and an open second end, a wire cavity within the outer shell configured to rotatably couple to one or more wires, a plurality of raised ribs on the surface of the outer shell, each of the raised ribs defining a channel between the raised rib and an adjacent raised rib, each of the raised ribs comprising an outer surface at the top of each channel, side walls extending from the top of each channel to a bottom of each channel, and a bottom wall connecting the side walls of each raised rib and each adjacent raised rib, a plurality of rib caps overmolded on to the top surface of each of the plurality of raised ribs, the plurality of rib caps comprising a gap between the rib cap corresponding to each of the raised ribs and the rib cap corresponding to each adjacent raised rib, two leverage wings extending outward from the outer shell on opposing sides of the outer shell between the first end and the second end, and a wire skirt overmolded on to the second end of the outer shell, surrounding the open second, end and extending away from the open second end, the wire skirt and plurality of rib caps formed of a material more flexible than a material used to form the outer shell.

Particular embodiments may comprise one or more of the following features. Each of the two leverage wings may comprise a first side and a second side, and a wing rib overmolded on to a portion of the first side of each of the leverage wings. Each of the two leverage wings may further comprise a wing rib overmolded on to a portion of the first side of each of the leverage wings but not on to any of the second side of each of the leverage wings. A base adjacent the open second end, the base at least partially having a frustoconical shape and having a height. The base may comprise a smooth surface except for a raised texture on the smooth surface. The raised texture may comprise a plurality of elongated rib grip bumps extending outward from the smooth surface of the base and spaced about the base. A plurality of elongated rib grip bumps may extend outward from a surface of the base and spaced about the base.

The foregoing and other aspects, features, applications, and advantages will be apparent to those of ordinary skill in the art from the specification, drawings, and the claims. Unless specifically noted, it is intended that the words and phrases in the specification and the claims be given their plain, ordinary, and accustomed meaning to those of ordinary skill in the applicable arts. The inventors are fully aware that he can be his own lexicographer if desired. The inventors expressly elect, as their own lexicographers, to use only the plain and ordinary meaning of terms in the specification and claims unless they clearly state otherwise and then further, expressly set forth the "special" definition of that term and explain how it differs from the plain and ordinary meaning. Absent such clear statements of intent to apply a "special" definition, it is the inventors' intent and desire that the simple, plain and ordinary meaning to the terms be applied to the interpretation of the specification and claims.

The inventors are also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

Further, the inventors are fully informed of the standards and application of the special provisions of 35 U.S.C. § 112 (f). Thus, the use of the words "function," "means" or "step" in the Detailed Description or Description of the Drawings or claims is not intended to somehow indicate a desire to invoke the special provisions of 35 U.S.C. § 112 (f), to define the invention. To the contrary, if the provisions of 35 U.S.C. § 112 (f) are sought to be invoked to define the inventions, the claims will specifically and expressly state the exact phrases "means for" or "step for", and will also recite the word "function" (i.e., will state "means for performing the function of [insert function]"), without also reciting in such phrases any structure, material or act in support of the function. Thus, even when the claims recite a "means for performing the function of . . . " or "step for performing the function of . . . ," if the claims also recite any structure, material or acts in support of that means or step, or that perform the recited function, then it is the clear intention of the inventors not to invoke the provisions of 35 U.S.C. § 112 (f). Moreover, even if the provisions of 35 U.S.C. § 112 (f) are invoked to define the claimed aspects, it is intended that these aspects not be limited only to the specific structure, material or acts that are described in the preferred embodiments, but in addition, include any and all structures, materials or acts that perform the claimed function as described in alternative embodiments or forms of the disclosure, or that are well known present or later-developed, equivalent structures, material or acts for performing the claimed function.

The foregoing and other aspects, features, and advantages will be apparent to those of ordinary skill in the art from the specification, drawings, and the claims.

BRIEF DESCRIPTION OF THE DRAWINGS

Implementations will hereinafter be described in conjunction with the appended drawings, where like designations denote like elements, and.

Figure 1:
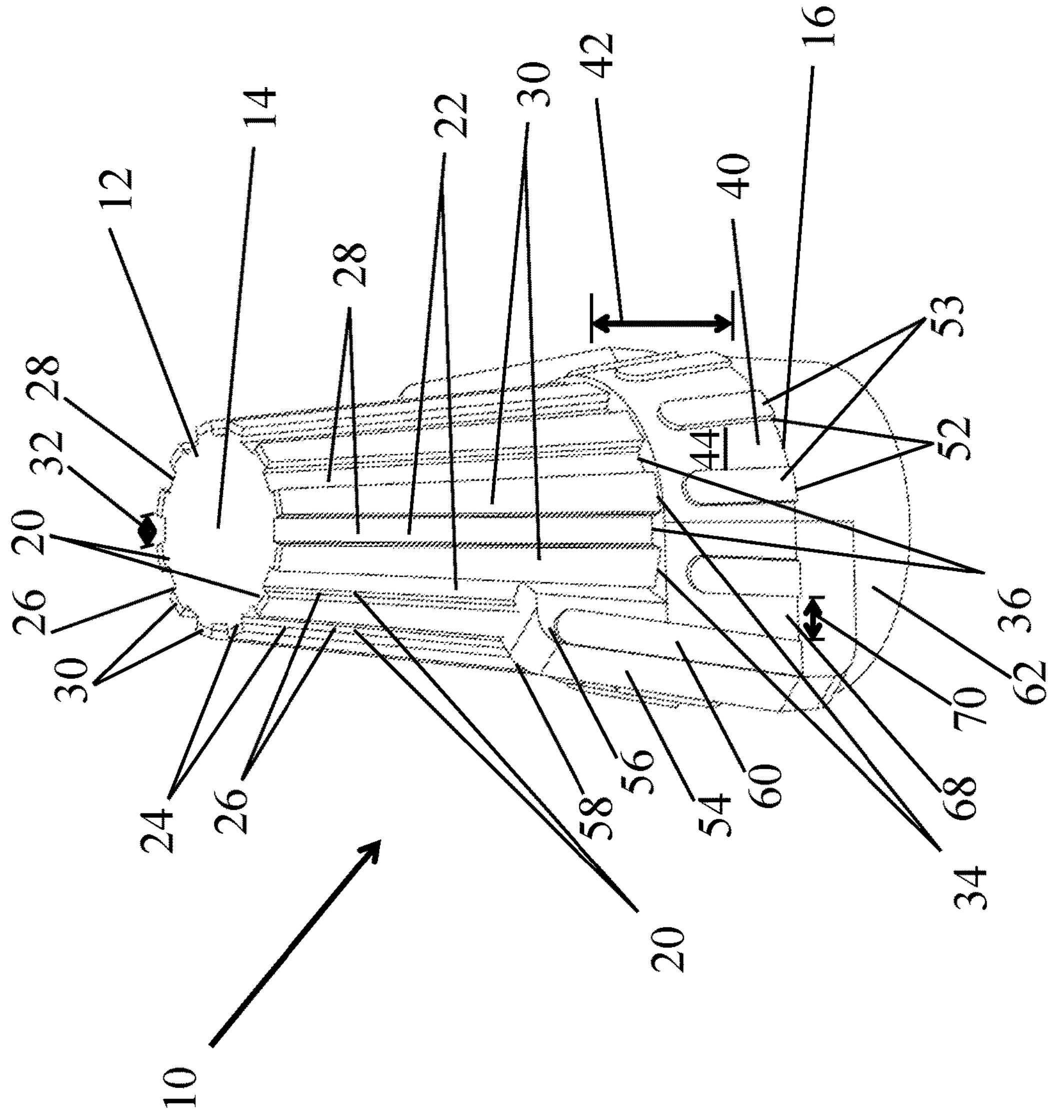
FIG. 1 is a perspective view of a wire connector with coated grip ribs.
Figure 3:
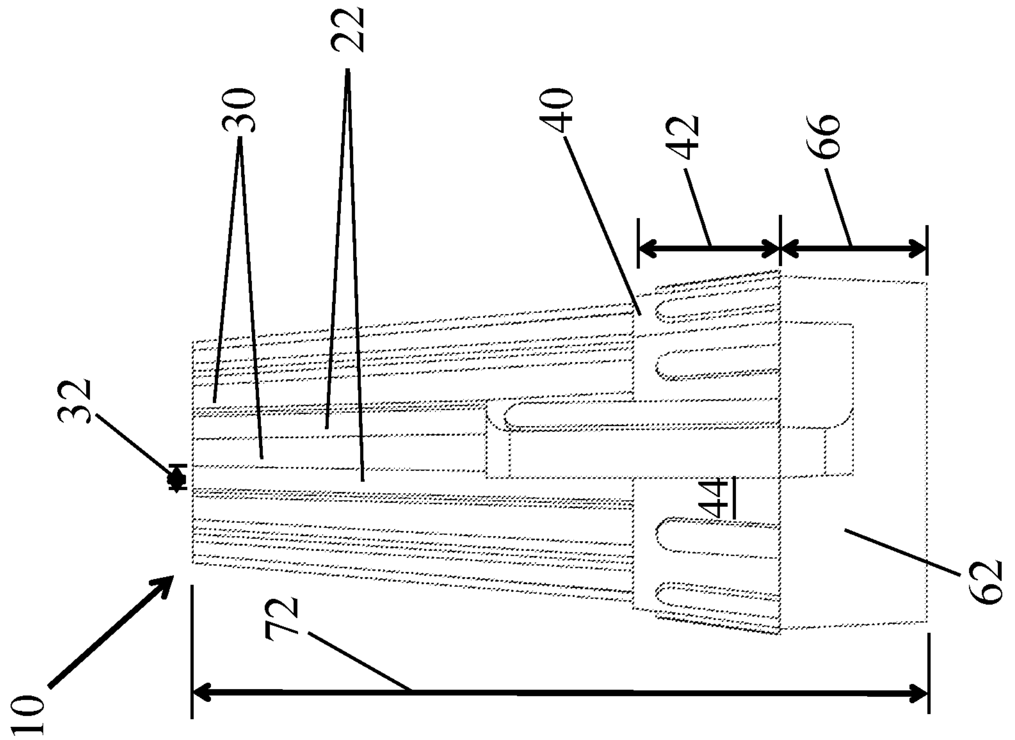
FIG. 3 is a side view of the wire connector of FIG. 1.
Figure 2:
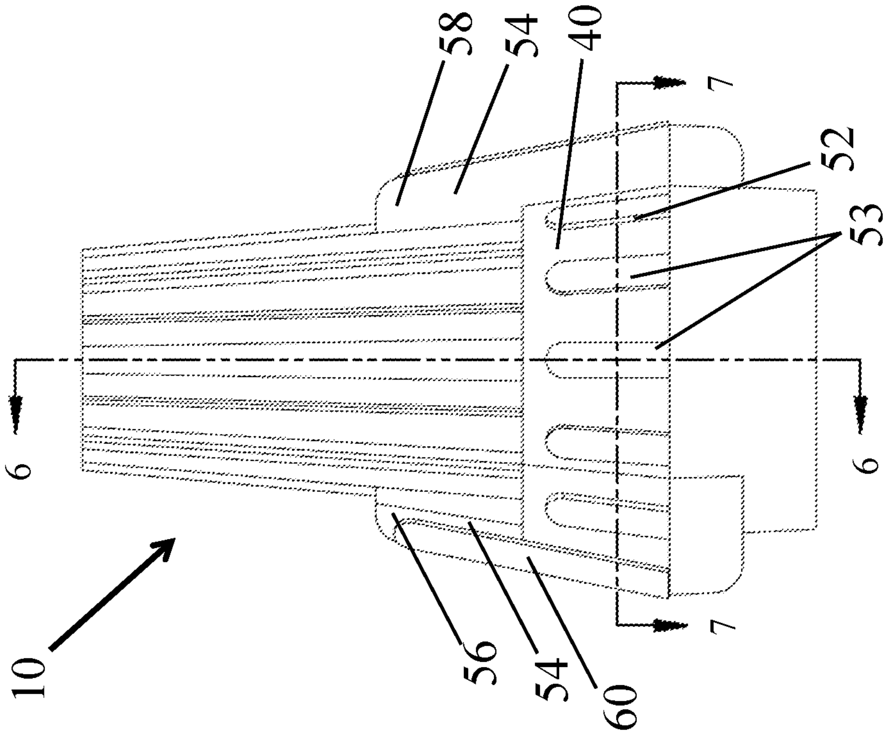
FIG. 2 is a front view of the wire connector of FIG. 1.
Figure 5:
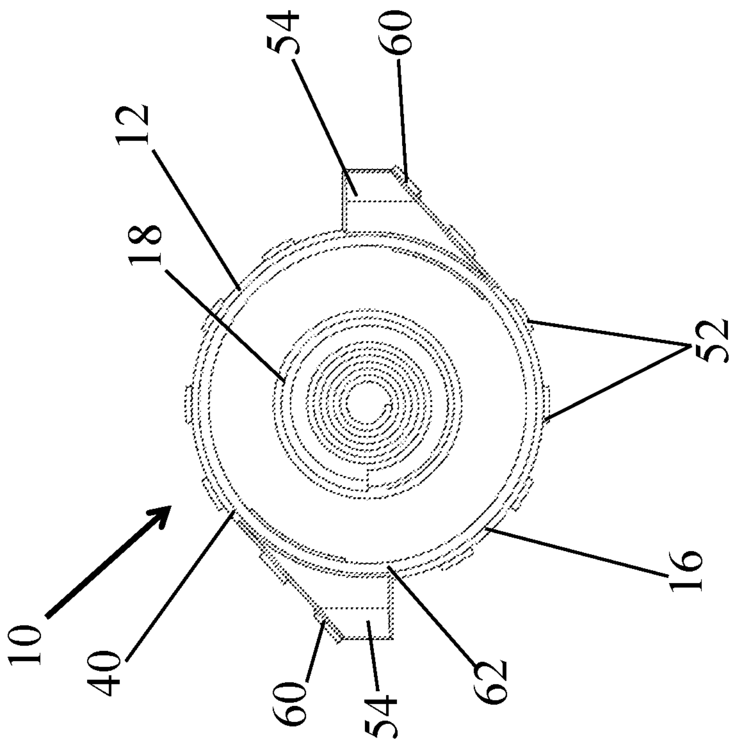
FIG. 5 is a bottom view of the wire connector of FIG. 1.
Figure 4:
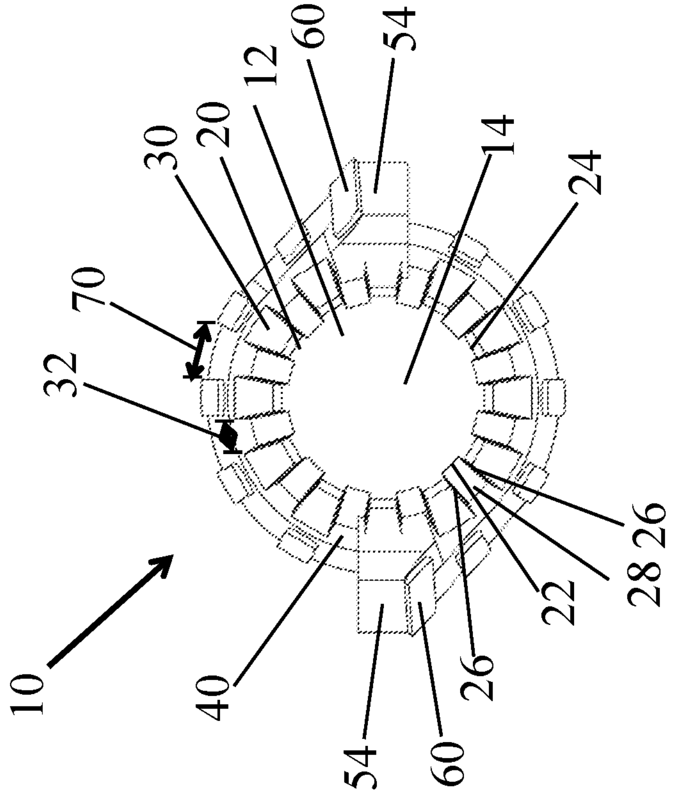
FIG. 4 is a top view of the wire connector of FIG. 1.
Figure 7:
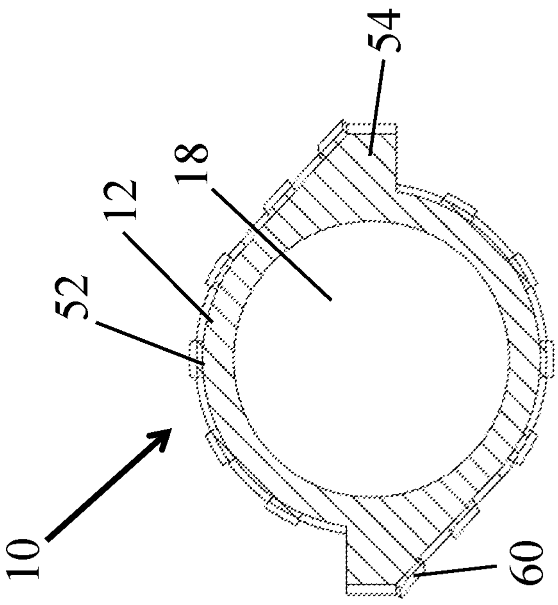
FIG. 7 is a cross-sectional view of the wire connector of FIG. 1 taken along section lines 7-7 of FIG. 2.
Figure 6:
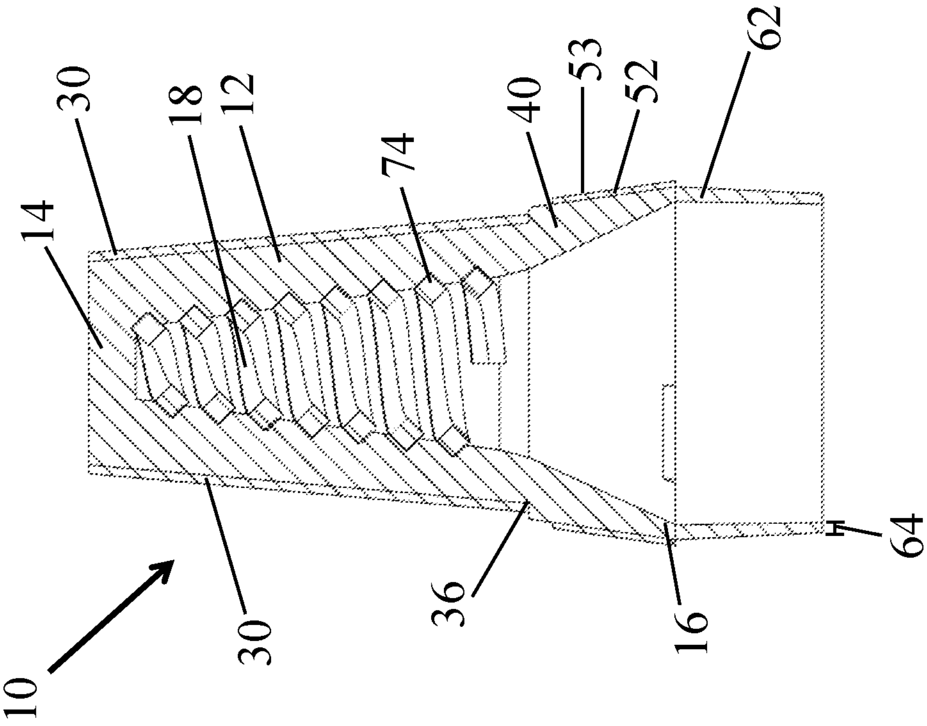
FIG. 6 is a cross-sectional view of the wire connector of FIG. 1 taken along section lines 6-6 of FIG. 2.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of implementations.

DETAILED DESCRIPTION

In the following description, reference is made to the accompanying drawings which form a part hereof, and which show by way of illustration possible implementations. It is to be understood that other implementations may be utilized, and structural, as well as procedural, changes may be made without departing from the scope of this document. As a matter of convenience, various components will be described using exemplary materials, sizes, shapes, dimensions, and the like. However, this document is not limited to the stated examples and other configurations are possible and within the teachings of the present disclosure. As will become apparent, changes may be made in the function and/or arrangement of any of the elements described in the disclosed exemplary implementations without departing from the spirit and scope of this disclosure.

FIGS. 1-7 illustrate a particular embodiment of a wire connector 10 with an outer shell 12 typically formed of a substantially rigid plastic or some other insulative material, such as polypropylene, having a closed first end 14 and an open second end 16. The outer shell 12 may be formed of any material which is known in the art for forming wire connectors. A wire cavity 18 is included within the outer shell 12 that may narrow as the wire cavity 18 nears the closed first end 14. The cavity is configured to rotatably couple to one or more wires when the wire connector 10 is twisted on to the wire(s). To rotatably couple to the wire(s), the internal cavity may include an internally threaded surface, or a spring, such as a square cross-section spring 74 (FIG. 6) or other metallic component with a pitched internal surface that narrows toward the closed first end so that as the wire connector 10 is twisted onto the wire(s), the surface draws the wire(s) toward the closed first end to retain the wire(s) within the wire cavity 18.

On an outer surface of the outer shell 12, a plurality of raised ribs 20 are included that extend between the first end 14 and the second end 16 of the outer shell 12. The plurality of raised ribs 20 define a plurality of channels 22 between each adjacent raised rib 20. The plurality of channels 22 extend substantially parallel to the plurality of raised ribs 20. Each raised rib 20 includes a top surface 24 extending the length of the raised rib 20 to its terminal end 34, and each channel 22 includes side walls 26 and a bottom wall 28 extending the length of the channel 22 to its terminal end 36.

A rib cap 30 is positioned on the top surface 24 of each raised rib 20. The rib caps 30 are formed of a material more flexible than the material which the outer shell 12 is formed of. In a particular embodiment, the rib caps 30 are overmolded onto the raised ribs 20 of the outer shell 12 using standard overmolding processes used for overmolding materials onto selective areas of plastic. The overmolding materials for the rib caps 30 found advantageous for providing enhanced grip includes any of rubber, silicone, urethane, synthetic rubbers and fluoropolymer elastomers such as those manufactured by DuPont® under the trademark Viton®, ethylene propylene diene monomer (EPDM) rubber, and thermoplastic elastomers such as neoprene and santoprene. It has been found that applying a rib cap 30 having a thickness of between 0.010"-0.025" works well.

Each of the rib caps 30 has a gap 32 between one rib cap 30 and an adjacent rib cap 30 so that the bottom wall of the channels 22 does not include overmolded materials and leaves the substantially rigid material used to form the outer shell 12 exposed within the channel. It will be understood by those of ordinary skill in the art that due to overmolding process realities, there may be some extension of the overmolded material of the rib caps 30 beyond just the top surface 24 of the raised ribs 20 so that a portion of the side walls 26 of the channels 22 may include some overmolded material, though a majority of the side walls 26 is left bare overmolded materials and exposed. The inclusion of a gap 32 between the rib caps 30, gives an added advantage over completely overmolding the material into the channels. By including a gap 32, a portion of the channel the side walls 26 is exposed so that when a user applies a twisting force to the wire connector with the user's fingers, the rib cap 30 material compresses comfortably and if additional force is needed, the user's fingers will compress the rib cap 30 material to a point where the user's fingers contact the substantially rigid, and less flexible material of the outer shell 12 within the gaps 32 by contacting the side walls 26 of the channels 22 to allow for a more rigid grip without the more flexible rib caps 30 preventing access to the channel side walls 26 when it is needed. If there is no gap, the user's fingers, which may be contaminated with sweat or moisture or other materials causing them to slip on the rib cap 30 overmolded material, may slip and be unable to easily maintain the gripping force needed to engage or disengage the wire connector 10 from the wires to which it is attached. Thus, when it is needed, the inclusion of gaps 32 gives user fingers the comfort of the overmolded material with an enhanced grip over completely overmolded surfaces.

Figure 9:
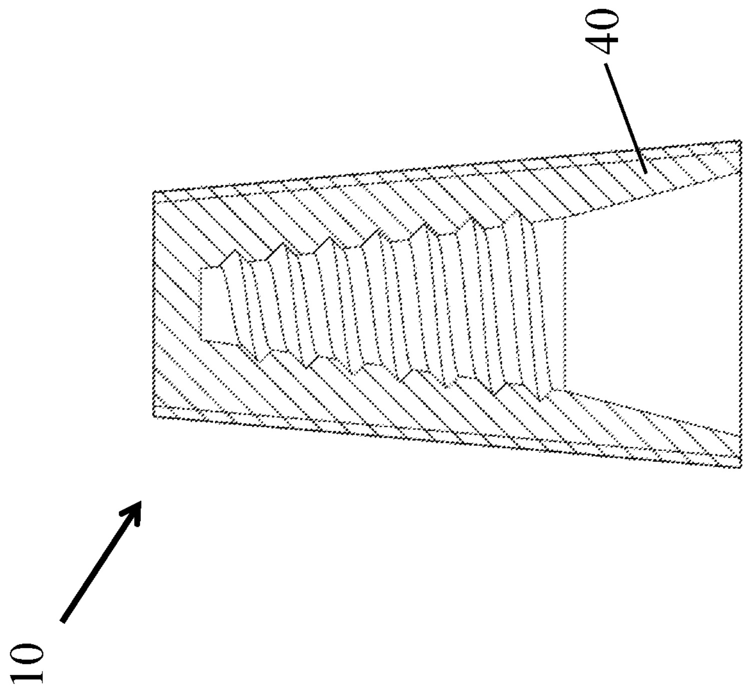
FIG. 9 is a cross section view similar to FIG. 6, but of the wire connector of FIG. 8.
Figure 8:
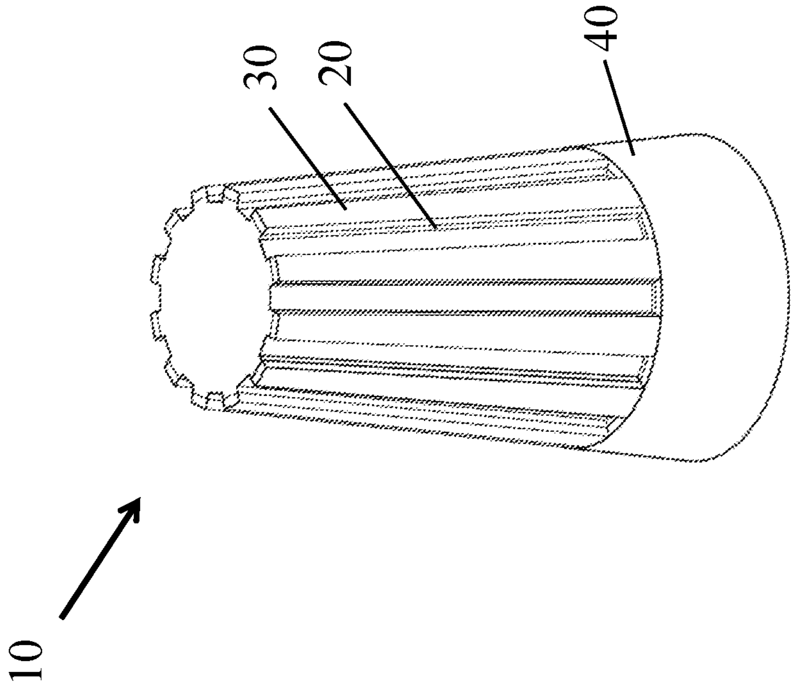
FIG. 8 is a perspective view of a wire connector with coated grip ribs and base.
Figure 10:
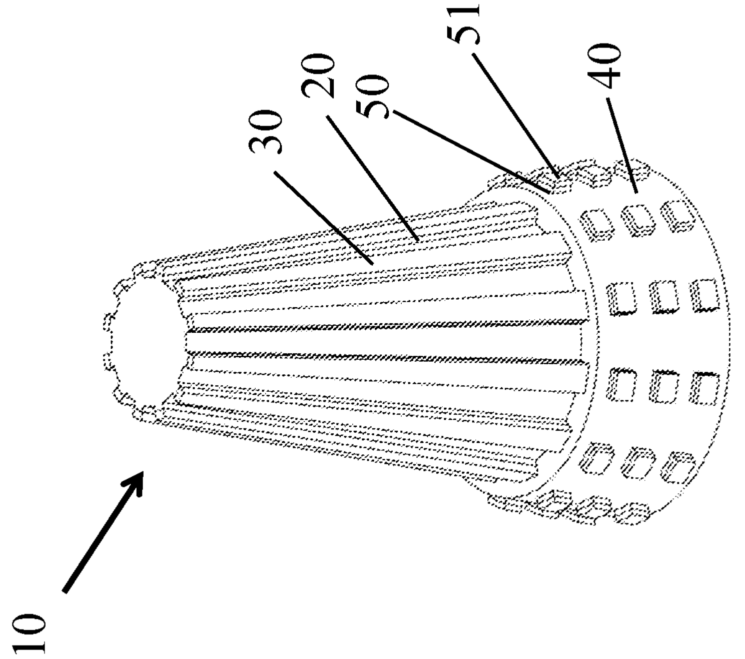
FIG. 10 is a perspective view of a wire connector with coated grip ribs and base grip bumps.
Figure 11:
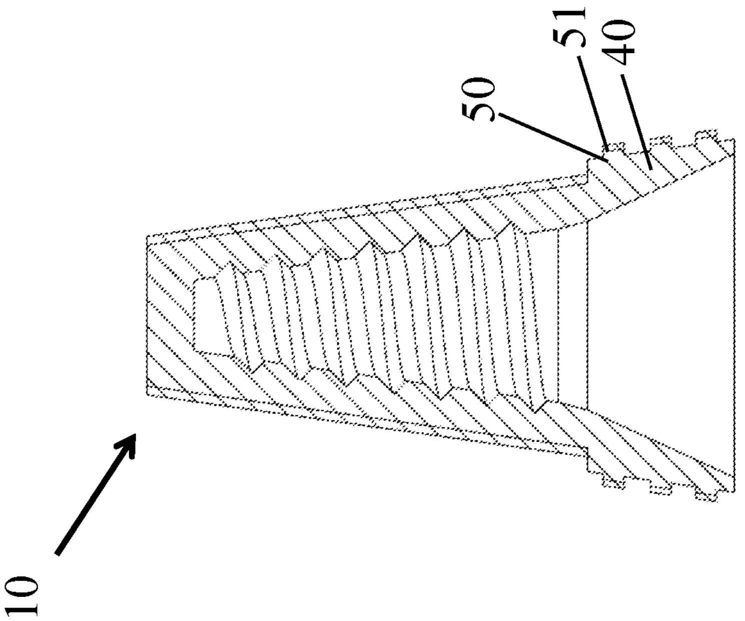
FIG. 11 is a cross section view similar to FIG. 6, but of the wire connector of FIG. 10.
Figure 12:
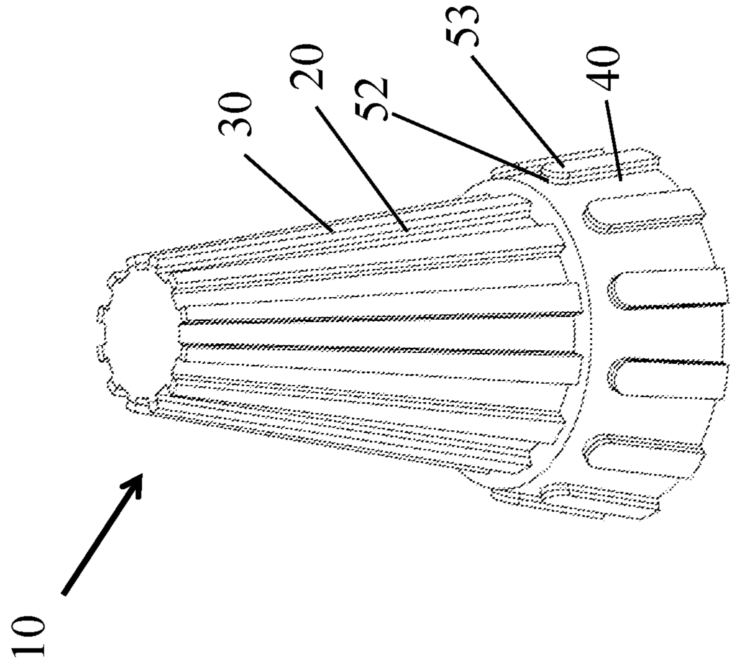
FIG. 12 is a perspective view of a wire connector with coated grip ribs and base ribs.
Figure 13:
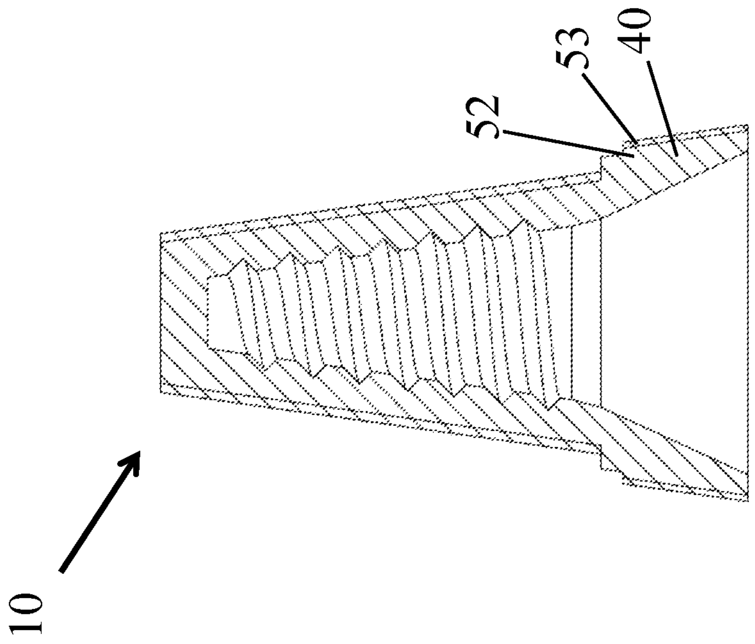
FIG. 13 is a cross section view similar to FIG. 6, but of the wire connector of FIG. 12.
Figure 15:
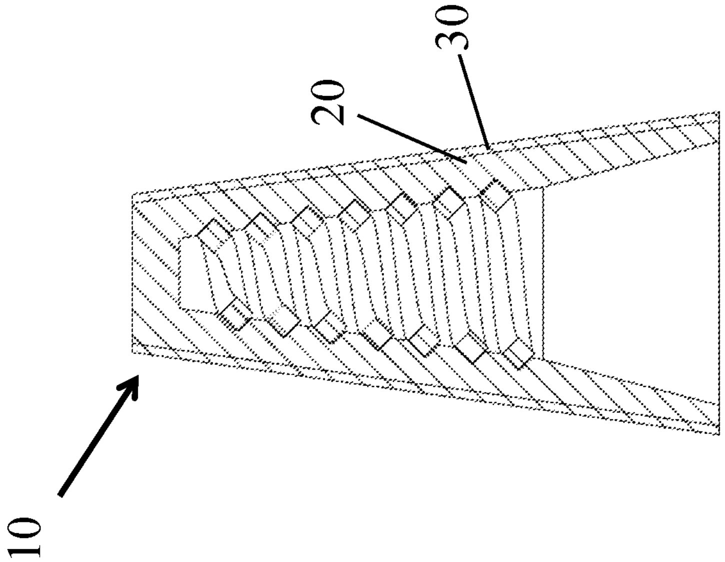
FIG. 15 is a cross section view similar to FIG. 6, but of the wire connector of FIG. 14.
Figure 14:
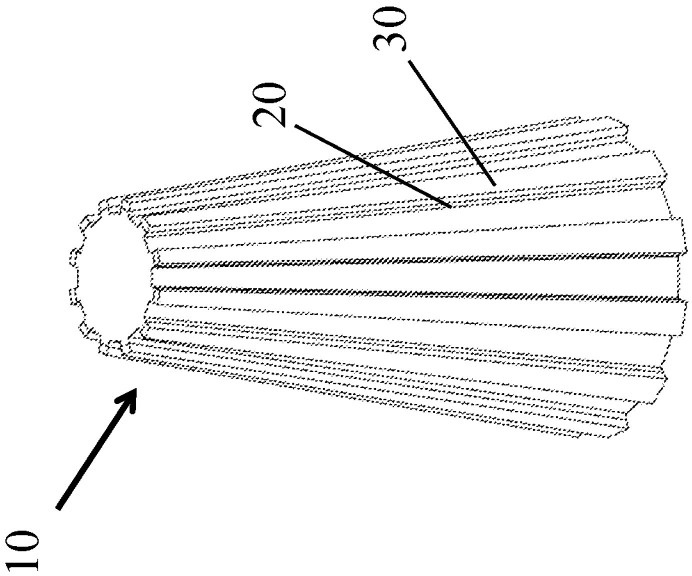
FIG. 14 is a perspective view of a wire connector with full length coated grip grip bumps.
Figure 17:
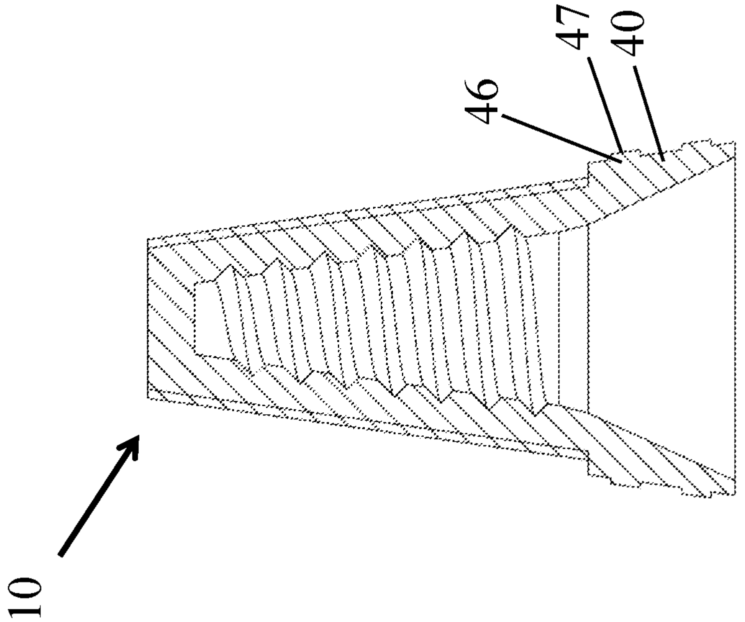
FIG. 17 is a cross section view similar to FIG. 6, but of the wire connector of FIG. 16.
Figure 16:
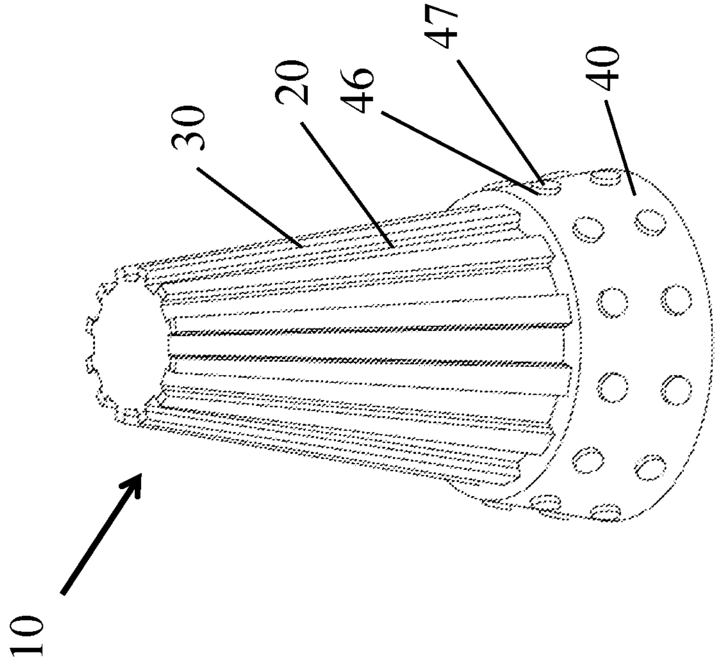
FIG. 16 is a perspective view of a wire connector with circular coated grip grip bumps.
Figure 19:
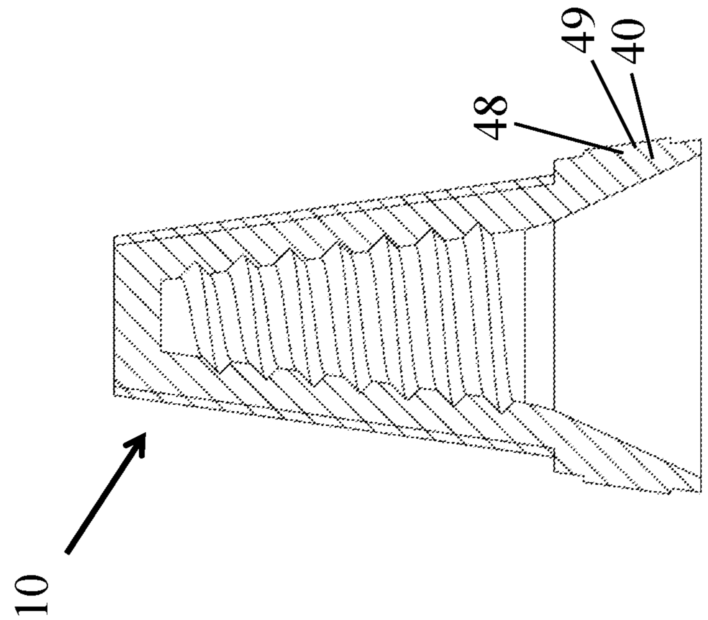
FIG. 19 is a cross section view similar to FIG. 6, but of the wire connector of FIG. 18.
Figure 18:
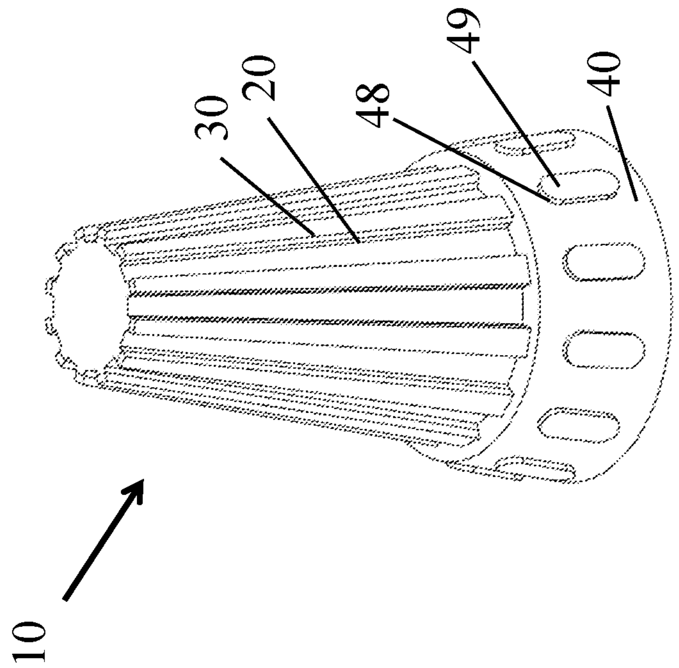
FIG. 18 is a perspective view of a wire connector with oval coated grip grip bumps.

In some embodiments, including the one illustrated in FIGS. 1-7, the wire connector 10 includes an annular base 40 circumscribing the wire connector 10 at the terminal end 36 of the channels. The annular base 40 has a height 42 and a surface 44. To assist a user in gripping the wire connector 10, a texture may be included on the surface 44 of the annular base 40 within its height 42. The texture may be formed in a number of different shapes depending upon the intended design of the wire connector 10. FIGS. 8-9 illustrate an embodiment with no texture on the annular base 40. FIGS. 10-11 illustrate rectangular grip bumps 50 extending outwardly from the surface 44 of the annular base 40. In this embodiment, the rectangular grip bumps 50 are formed in three concentric rows and twelve of columns each aligned with a corresponding raised rib 20. FIGS. 12-13 illustrate elongated rib grip bumps 52 that extend from within the annular base 40 toward the open second end 16 of the outer shell 12. FIGS. 16-19 illustrate elliptical grip bumps 46, 48 in the form of circles in two concentric rows of twelve columns each aligned with a corresponding raised rib 20 (FIGS. 16-17) and ovals in a single row of twelve ovals each aligned with a corresponding raised rib 20 (FIGS. 18-19). Alternatively, any other shape or type of raised texture may be included on the annular base 40 to enhance user grip. FIGS. 14-15 illustrate an embodiment without an annular base so that the channels 22 extend fully from the closed first end 14 to the open second end 16. Although not required for functionality, aligning the raised grip bumps on the annular base 40 may enhance grip and consistency of feel for the user when twisting the wire connector 10.

In some embodiments, including the ones illustrated herein, each of the texture features that extend outwardly from the annular base 40 may further include bump caps 47, 49, 51, 53 that are overmolded onto the respective grip bumps of the various designs. The overmolding occurs proximate the overmolding of the rib caps 30 and uses the same material that the rib caps 30 are formed from. By including overmolded bump caps 47, 49, 51, 53 on the top surfaces of the various grip bumps 46, 48, 50, 52 but not in a bottom surface 68 of a gap 70 between the grip bumps 46, 48, 50, 52, a user's fingers can find purchase against a rigid, uncoated surface of the sides of the grip bumps 46, 48, 50, 52 when needed, in addition to having the comfort of the overmolded bump caps 47, 49, 51, 53.

Particular embodiments, including the embodiment illustrated in FIGS. 1-7, may include two or more leverage wings 54 extending outward at opposing sides of the outer shell 12 to provide additional surfaces through which the user can apply leverage to engage or disengage the wire connector 10 from wire(s) to which the wire connector 10 is attached. Each leverage wing 54 includes a first side 56 and a second side 58. A wing rib 60 may be formed or overmolded on at least the first side 56 of each leverage wing to provide comfort and additional grip to the user's fingers. In particular embodiments, including that illustrated in FIG. 2, the wing rib 60 is positioned along an outer edge of the leverage wings 54. By including a wing rib 60 rather than merely a smooth surface, the user gets additional purchase against the surface of the leverage wing to enhance gripping and twisting power.

In some embodiments, including the embodiment illustrated in FIGS. 1-7, an additional wire skirt 62 may be included around the open second end 16 of the outer shell 12. The skirt may be overmolded proximate the overmolding process of, and of the same material as, the rib caps and bump caps. Alternatively, the wire skirt may be formed separately and adhered to the outer shell 12 through an appropriate adhesive or heat welding or other method known in the art.

Because the skirt is also made of an insulative material softer and more flexible than the substantially rigid material of the outer shell 12, it provides an insulative shelter around the bare ends of wire(s) to which the wire connector is attached, but easily compresses to tightly fit within electrical boxes or other places with limited space. Occasionally, wires are stripped too far when they are prepared for attachment with a wire connector. In such cases, the bare portion of the wire may extend beyond the open end of the wire connector and present a risk of contact with an unintended wire or conductive surface. Additionally, flash-over and arcing is a risk between conductive surfaces that are not insulated from each other. By including an additional wire skirt around the open second end 16 of the outer shell 12, many of these risks can be mitigated. It has been found that a skirt length of between 25-40% of the total length 72 of the wire connector 10 is effective. In other words, if a wire connector 10 has a total length of 1.5", the wire skirt portion of that total length 72 would be between 0.375" and 0.600" long. The insulative thickness 64 of material between 0.010" to 0.050" has also been found to be effective for wire connectors. The additional length added to a wire connector 10 by using a wire skirt 62 also allows use of the wire connectors 10 in a wider variety of wire connecting situations.

It will be understood that implementations of wire connectors are not limited to the specific configurations, assemblies, devices and components disclosed in this document, as virtually any assemblies, devices and components consistent with the intended operation of wire connectors may be modified according to the principles discussed herein. Accordingly, for example, although particular wire connectors, and other assemblies, devices and components are disclosed, such may include any shape, size, style, type, model, version, class, measurement, concentration, material, weight, quantity, and/or the like consistent with the intended operation of wire connectors. Implementations are not limited to uses of any specific assemblies, devices and components; provided that the assemblies, devices and components selected are consistent with the intended operation of wire connectors.

Accordingly, the components defining any wire connector implementations may be formed of any of many different types of materials or combinations thereof that can readily be formed into shaped objects provided that the components selected are consistent with the intended operation of a wire connector implementation. For example, the components may be formed of: polymers such as thermoplastics (such as ABS, Fluoropolymers, Polyacetal, Polyamide; Polycarbonate, Polyethylene, Polysulfone, and/or the like), thermosets (such as Epoxy, Phenolic Resin, Polyimide, Polyurethane, Silicone, and/or the like), any combination thereof, and/or other like materials; glasses (such as quartz glass), carbon-fiber, aramid-fiber, any combination thereof, and/or other like materials; composites and/or other like materials; metals, such as zinc, magnesium, titanium, copper, lead, iron, steel, carbon steel, alloy steel, tool steel, stainless steel, brass, nickel, tin, antimony, pure aluminum, 1100 aluminum, aluminum alloy, any combination thereof, and/or other like materials; alloys, such as aluminum alloy, titanium alloy, magnesium alloy, copper alloy, any combination thereof, and/or other like materials; any other suitable material; and/or any combination of the foregoing thereof. In instances where a part, component, feature, or element is governed by a standard, rule, code, or other requirement, the part may be made in accordance with, and to comply under such standard, rule, code, or other requirement.

Various wire connectors may be manufactured using conventional procedures as added to and improved upon through the procedures described here. Some components defining wire connectors may be manufactured simultaneously and integrally joined with one another, while other components may be purchased pre-manufactured or manufactured separately and then assembled with the integral components. Various implementations may be manufactured using conventional procedures as added to and improved upon through the procedures described here.

Accordingly, manufacture of these components separately or simultaneously may involve extrusion, pultrusion, vacuum forming, injection molding, blow molding, resin transfer molding, casting, forging, cold rolling, milling, drilling, reaming, turning, grinding, stamping, cutting, bending, welding, soldering, hardening, riveting, punching, plating, and/or the like. If any of the components are manufactured separately, they may then be coupled with one another in any manner, such as with adhesive, a weld, a fastener (e.g. a bolt, a nut, a screw, a nail, a rivet, a pin, and/or the like), wiring, any combination thereof, and/or the like for example, depending on, among other considerations, the particular material forming the components.

It will be understood that the methods involving wire connectors are not limited to the specific order of steps as disclosed in this document. Any steps or sequence of steps of the assembly of wire connectors indicated herein are given as examples of possible steps or sequence of steps and not as limitations, since various assembly processes and sequences of steps may be used to assemble them.

The implementations of the wire connectors described are by way of example or explanation and not by way of limitation. Rather, any description relating to the foregoing is for the exemplary purposes of this disclosure, and implementations may also be used with similar results for a variety of other applications.

What is claimed is:

1. A wire connector comprising:

an outer shell comprising a first end and a second end;

a wire cavity within the outer shell configured to threadedly couple to one or more wires; and a plurality of raised ribs on a surface of the outer shell each raised rib of the plurality of raised ribs extending for a portion of a distance between the first end and the second end, wherein each raised rib of the plurality of raised ribs has a rib cap positioned on the raised rib and each rib cap is separated from an adjacent rib cap by a gap extending from the first end to the second end, and wherein each rib cap is separated from adjacent rib caps at the second end of the outer shell;

a plurality of channels individually defined between each raised rib of the plurality of raised ribs and an adjacent raised rib of the plurality of raised ribs, each channel of the plurality of channels having two side walls and a bottom wall, wherein each rib cap is formed of a material more flexible than a material of the outer shell.

2. The wire connector of claim 1, further comprising at least two leverage wings extending outward from the outer shell on opposing sides of the outer shell, wherein each leverage wing of the at least two leverage wings has a first side, a second side, and a wing rib overmolded onto a portion of the first side of the leverage wing, wherein the second side of the leverage wing is left exposed.

3. The wire connector of claim 2, wherein each wing rib is formed of a material more flexible than a material of the outer shell.

4. The wire connector of claim 1, further comprising at least two leverage wings on the outer shell, wherein each leverage wing of the at least two leverage wings has a first side, a second side, and a wing rib configured to cover a portion of the first side of the leverage wing and leave the second side of the leverage wing exposed.

5. The wire connector of claim 4, wherein each wing rib is formed of a material more flexible than a material of the outer shell.

6. The wire connector of claim 1, further comprising an annular base circumscribing the wire connector at the second end of the outer shell, also further comprising at least two leverage wings that extend outward from the outer shell and the annular base.

7. The wire connector of claim 6, wherein each leverage wing of the at least two leverage wings has a first side, a second side, and a wing rib configured to cover a portion of the first side of the leverage wing and leave the second side of the leverage wing exposed.

8. The wire connector of claim 6, further comprising a plurality of elongated rib grip bumps extending from the annular base.

9. The wire connector of claim 8, wherein each rib grip bump of the plurality of elongated rib grip bumps is aligned with a corresponding raised rib of the plurality of raised ribs and has a bump cap positioned on the rib grip bump, wherein each bump cap is formed of the same material as each rib cap.

10. The wire connector of claim 1, the outer shell formed of a first material, and the plurality of raised ribs formed of the first material.

11. A wire connector comprising:

an outer shell comprising a first end and a second end;

a wire cavity within the outer shell configured to couple to one or more wires; and a plurality of raised ribs on a surface of the outer shell, each raised rib of the plurality of raised ribs extending for at least a portion of a distance between the first end and the second end, wherein each raised rib of the plurality of raised ribs has a rib cap positioned on the raised rib and each rib cap is separated from an adjacent rib cap by a gap from the first end to the second end;

wherein each of the plurality of raised ribs defines a channel between each raised rib and an adjacent raised rib of the plurality of raised ribs, wherein each channel has a bottom wall and two side walls;

wherein each rib cap is formed of a material more flexible than a material of the outer shell.

12. The wire connector of claim 11, further comprising at least two leverage wings extending outward from the outer shell on opposing sides of the outer shell, wherein each leverage wing of the at least two leverage wings has a first side, a second side, and a wing rib overmolded onto a portion of the first side of the leverage wing, wherein the second side of the leverage wing is left exposed.

13. The wire connector of claim 12, wherein each wing rib is formed of a material more flexible than a material of the outer shell.

14. The wire connector of claim 12, further comprising an annular base circumscribing the wire connector at the second end of the outer shell, and a wire skirt circumscribing the wire connector at the open second end of the outer shell.

15. The wire connector of claim 11, further comprising at least two leverage wings on the outer shell, wherein each leverage wing of the at least two leverage wings has a first side, a second side, and a wing rib configured to cover a portion of the first side of the leverage wing and leave the second side of the leverage wing exposed.

16. The wire connector of claim 15, wherein each rib cap is overmolded onto a corresponding raised rib and each wing rib is overmolded onto the first side of a corresponding leverage wing.

17. The wire connector of claim 11, further comprising an annular base circumscribing the wire connector at the second end of the outer shell and at least two leverage wings extending outward from the outer shell and the annular base.

18. The wire connector of claim 17, further comprising a plurality of elongated rib grip bumps extending from the annular base, wherein each rib grip bump of the plurality of elongated rib grip bumps is aligned with a corresponding raised rib of the plurality of raised ribs and has a bump cap positioned on each rib grip bump.

19. The wire connector of claim 11, wherein the channel defined by the plurality of raised ribs extends from a tip of the first end of the outer shell to a tip of the second end of the outer shell.

20. The wire connector of claim 11, the outer shell formed of a first material, and the plurality of raised ribs formed of the first material.

* * * * *